March 4, 1952

R. W. BORDEWIECK 2,587,589

SEALED LENS PHOTOTUBE

Filed Nov. 3, 1947

INVENTOR.

Robert W. Bordewieck

BY Charles P. Fay

ATTORNEYS.

Patented Mar. 4, 1952

2,587,589

UNITED STATES PATENT OFFICE 2,587,589

SEALED LENS PHOTOTUBE

Robert W. Bordewieck, Natick, Mass., assignor, by mesne assignments, to Moore Electronic Laboratories, Inc., Worcester, Mass., a corporation of Massachusetts Application November 3, 1947, Serial No. 783,789

1 Claim. (Cl. 313—101)

This invention relates to a new photoelectric tube and a special adaptation thereof so that the phototube has a light collecting lens sealed integrally with the housing of the tube. The lens serves to collect light from over its entire surface and concentrate this light energy onto a relatively small cathode inside the housing, thus giving all the advantages in increased sensitivity formerly obtained by using a lens plus a phototube with the further advantage that the conventional glass window of an ordinary phototube is eliminated and, therefore, cannot get dirty or cause light energy losses by reflection. Also, the back of the lens is part of the evacuated photoelectric tube in this invention so that it also remains clean. A further advantage which is not obtainable with any other phototube is the built-in guard circuit obviating leakage.

Other objects and advantages of the invention will appear hereinafter.

Reference is to be had to the accompanying drawing in which

Figure 1:
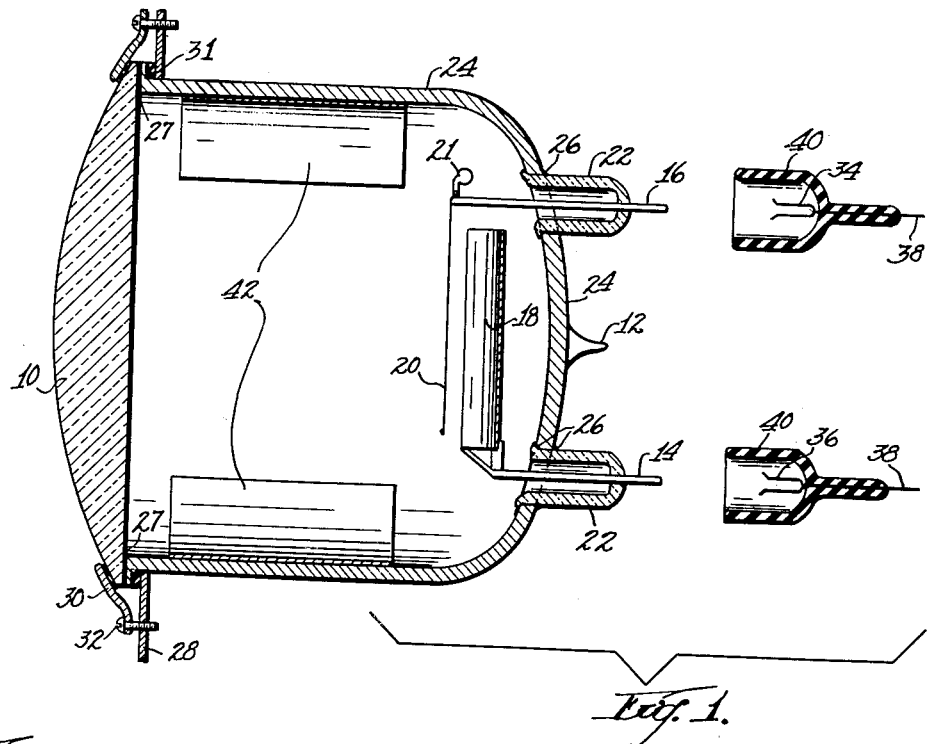
Fig. 1 is a sectional view showing method of installation.
Figure 2:
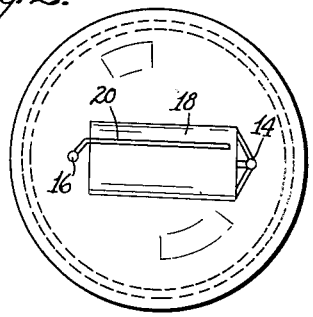
Fig. 2 is a partial front view showing position of cathode and anode.
Figure 3:
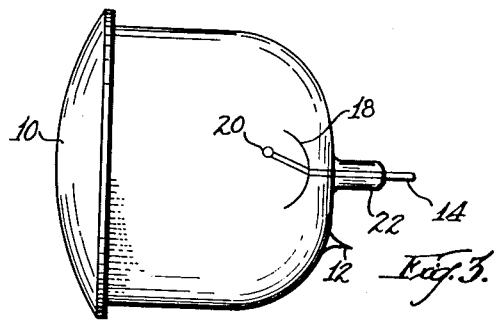
Fig. 3 is a side view showing position of elements and connecting pins.
Figure 4:
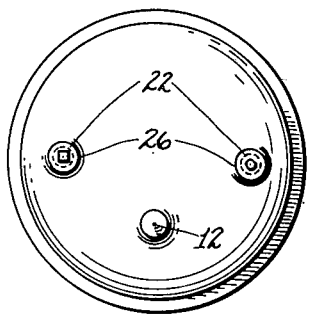
Fig. 4 is a back view.

Referring to Fig. 1 the character 10 indicates a collecting lens not necessarily optically perfect, designed to concentrate light from in front of the phototube onto a cathode 18. Lens 10 may be colored to transmit only definite colors and thus give the phototube a predictable amount of color discrimination, or it may be of clear glass to pass all colors, or quartz to pass ultra-violet rays, or lead glass to prevent the passage of infra-red rays. Thus by choosing quartz, clear glass, lead glass, or various colored glass for the lens, we are able to use the phototube to detect signals varying from ultra-violet to infra-red with a great deal more selectivity than could be obtained by changing the cathode material alone. Different coatings of photoemissive material may be used on the cathode to change the color response and sensitivity. Because the lens concentrates most of the light striking its large area onto the cathode, this construction also gives a great deal more sensitivity than a normal phototube.

The spacing of lens and cathode is very important to ideal functioning of this invention. If the cathode were at the focal point of the lens, sunlight if it entered directly would tend to overheat and destroy the sensitized surface. Therefore, the cathode should either be placed in front of or behind the focal point. The forward position gives a wider viewing angle while the latter provides a smaller viewing angle. The viewing angle could be increased by silvering or painting the inner walls of the housing as at 42. By silvering only the sides and not the top and bottom a broad, relatively flat viewing angle is obtained.

Character 12 indicates a sealed glass tube by means of which the tube is evacuated and left as a vacuum type phototube, or after evacuation a small quantity of argon or another inert gas may be inserted through this tube before sealing it to convert it into a gas phototube, thus increasing its sensitivity over the vacuum type. Pins 14 and 16 are of different sizes or shapes to polarize connection to them and they connect to cathode 18 and anode 20 respectively. Metal pins 14 and 16 are sealed to a glass or insulation protuberance 22 which is in turn sealed as at 26 to the tube housing 24. Cathode 18 may be of standard phototube construction with photoelectric material coated on a metal base, while anode 20 is a metal rod or loop small enough so as not to interfere with light striking the cathode and sturdy enough to withstand shock and vibration.

Housing 24 may be made of copper or other metal or may be of opaque glass or other suitable material. In any case it is sealed at 26 and 27 to provide a lasting vacuum tight seal.

Provisions for mounting are provided in the flange of the lens. The numeral 28 represents a metal or other wall in which the phototube is to be mounted. A ring flange 30 secured by screws 32 fasten the tube against a gasket 31. By similar means this tube could be mounted in a device resembling an automobile sealed-beam headlight housing.

Connection is made to the photoelectric tube elements by pushing clips 34 and 36 onto pins 16 and 14, respectively, while leads 38 connect into the photoelectric circuit. Rubber nipples 40 keep dust, dirt, and moisture off the connection and maintain the leakage resistance high.

A getter 21 may be used to eliminate residual active gases after evacuation and sealing.

Figure 5:
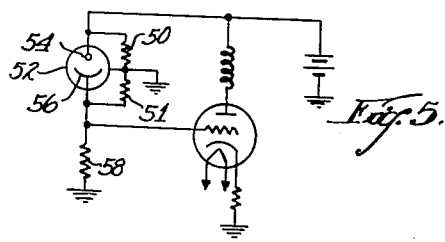
Fig. 5 is a simple circuit in which the tube may be used.

Leakage across the phototube terminals is probably the most troublesome cause of failure of photoelectric circuits exposed to the weather or humid conditions. By using raised glass pin supports 22 a long leakage path is obtained between terminals. By covering the terminals with rubber or plastic nipples, moisture and dirt are prevented from settling on the glass and lowering the insulation resistance. By one method of construction of the tube, leakage is eliminated further by a grounded guard circuit. In Fig. 5 is shown a typical photoelectric circuit with the insulation resistance 50 and 51 in parallel with the phototube 52. If instead of allowing leakage currents to run from one terminal to another, a ground shield is inserted between terminals the leakage runs from the phototube anode terminal 54 directly to ground and not to the cathode 56 and thence through the grid resistor 58 to ground. Resistance 51 is a high resistance in parallel with 58 when the ground shield is connected. In my invention housing 24 can be made of metal and grounded through panel 28 or by other means thus automatically inserting a ground shield into the circuit, provided panel 28 is grounded. If housing 24 is made of glass a conductive coating could be painted or otherwise placed on its surface running between the connecting pins from top of the lens to the bottom. This coating could also be replaced by a strip of metal A.

Thus described is a phototube employing one small cathode having the sensitivity of many phototubes with larger-sized cathodes all placed in parallel, with much greater stability due mainly to the greatly reduced leakage between the terminals of the phototube. In addition to this the phototube is directional and may be made quite color sensitive.

The anode and cathode described above could be mounted in a small tube and this tube inserted in the larger housing to achieve essentially the same results while the housing then could be left unevacuated but sealed. Also, the clips 34 and 36 may be coated with hygroscopic wax or the like to prevent leakage.

Having thus described my invention and the advantages thereof, I do not wish to be limited to the details herein disclosed otherwise than as set forth in the claim, but what I claim is:

A photoelectric tube comprising an evacuated metallic housing, there being an opening in the said housing, a lens sealed to the edges of said opening, photoelectric anode and cathode elements within the housing, a pair of spaced insulator bosses sealed to the edges of two additional holes in the said housing, a conducting pin attached to each boss, the said pins supporting in insulated manner from the housing the aforementioned anode and cathode members and to provide external connections to the same, the spacing of the lens to the cathode being sufficient so that light from a small angle only will be intercepted by the aforementioned cathode, thereby providing a phototube having high sensitivity and sharp directional properties and having ideal internal and external guard circuits by virtue of the metallic housing.

ROBERT W. BORDEWIECK.

REFERENCES CITED

The following references are of record in the file of this patent:

UNITED STATES PATENTS

| Number | Name | Date |
| --- | --- | --- |
| 755,840 | Bose | Mar. 29, 1904 |
| 1,133,435 | Fessenden | Mar. 30, 1915 |
| 1,809,676 | Culver | June 9, 1931 |
| 1,909,701 | McMaster | May 16, 1933 |
| 2,015,520 | Geffcken et al. | Sept. 24, 1935 |
| 2,056,392 | DeBoer et al | Oct. 6, 1936 |
| 2,060,977 | DeBoer et al. | Nov. 17, 1936 |
| 2,084,865 | Penning et al. | June 22, 1937 |
| 2,243,132 | Soller | May 27, 1941 |
| 2,306,376 | Beuchon | Dec. 29, 1942 |
| 2,337,401 | Miller | Dec. 21, 1943 |
| 2,372,450 | Rajchman et al. | Mar. 27, 1945 |
| 2,427,528 | Hickok | Sept. 16, 1947 |
| 2,444,915 | Cade | July 13, 1948 |
| 2,403,730 | MacNeille | July 9, 1949 |

FOREIGN PATENTS

| Number | Country | Date |
| --- | --- | --- |
| 685,165 | Germany | Dec. 13, 1939 |